(12) United States Patent
Sato et al.

(10) Patent No.: US 8,640,368 B2
(45) Date of Patent: Feb. 4, 2014

(54) LIGHT SOURCE DEVICE, LIGHTING DEVICE, AND DISPLAY DEVICE

(75) Inventors: Eiichi Sato, Hachioji (JP); Kenji Fukuoka, Fussa (JP); Hiroyasu Sato, Hachioji (JP)

(73) Assignee: OPTO Design, Inc. (JP)

( * ) Notice: Subject to any disclaimer, the term of this patent is extended or adjusted under 35 U.S.C. 154(b) by 8 days.

(21) Appl. No.: 13/057,430

(22) PCT Filed: Aug. 5, 2009

(86) PCT No.: PCT/JP2009/063888
§ 371 (c)(1),
(2), (4) Date: Feb. 3, 2011

(87) PCT Pub. No.: WO2010/016528
PCT Pub. Date: Feb. 11, 2010

(65) Prior Publication Data
US 2011/0131849 A1   Jun. 9, 2011

(30) Foreign Application Priority Data

Aug. 6, 2008 (JP) .................. 2008-203033
Jul. 1, 2009 (JP) .................. 2009-157312

(51) Int. Cl.
*G09F 13/18* (2006.01)

(52) U.S. Cl.
USPC .......................................... 40/546

(58) Field of Classification Search
USPC ......... 40/564; 349/64, 65; 362/628, 626, 620, 362/616, 615
See application file for complete search history.

(56) References Cited

U.S. PATENT DOCUMENTS 5,625,968 A * 5/1997 Ashall .................. 40/546
6,857,212 B2 * 2/2005 Velez .................... 40/546
(Continued)

FOREIGN PATENT DOCUMENTS

CN   1979309 A   6/2007
JP   8-153405 A   6/1996
(Continued)

OTHER PUBLICATIONS

"International Application Serial No. PCT/JP2009/063888, International Search Report mailed Nov. 2, 2009", (w/ English Translation), 3 pgs.

*Primary Examiner* — Joanne Silbermann
*Assistant Examiner* — Christopher E Veraa
(74) *Attorney, Agent, or Firm* — Schwegman, Lundberg & Woessner, P.A.

(57) ABSTRACT

A light source device is equipped with a highly directional point light source, a light source installation part having a prescribed area where the point light source is installed, and a lateral reflection part that is vertically arranged to a prescribed height from the periphery of the light source installation part. The lateral reflection part is formed with a light-transmitting reflector plate that has a reflection/transmission pattern and is provided with multiple reflection/transmission parts for reflecting and at least partially transmitting light. In the reflection/transmission pattern, multiple virtual radial lines are drawn from the light source to the light-transmitting reflector plate surface at prescribed angles, and for reflection/transmission parts (Di,j) present on the radial lines that are at the same distance from the point light source, the reflectivity and transmissivity are denoted as Re1 and Tr1 when the reflection/transmission part is on a radial line at a narrow viewing angle to the point light source, and when the reflection/transmission part is on a radial line at a wide viewing angle to the point light source, the reflectivity and transmissivity are denoted as Re2 and Tr2. The relationship therebetween is set as follows: Re1>Re2 and Tr1<Tr2.

9 Claims, 12 Drawing Sheets

(56) References Cited

U.S. PATENT DOCUMENTS

| | | |
|---|---|---|
| 7,077,557 B2 * | 7/2006 | Liu .............................. 362/629 |
| 7,108,414 B2 * | 9/2006 | McCollum et al. ........... 362/604 |
| 7,237,939 B2 * | 7/2007 | Kim et al. ..................... 362/616 |
| 7,273,308 B2 * | 9/2007 | Spero et al. ................... 362/560 |
| 7,478,942 B2 * | 1/2009 | Kim et al. ..................... 362/620 |
| 2004/0226202 A1 * | 11/2004 | Hillstrom et al. ............... 40/546 |
| 2007/0124970 A1 * | 6/2007 | Hjaltason ....................... 40/546 |
| 2007/0126950 A1 * | 6/2007 | Kurihara ........................ 349/65 |

FOREIGN PATENT DOCUMENTS

| | | |
|---|---|---|
| JP | 2001-236811 A | 8/2001 |
| JP | 2005-099406 A | 4/2005 |
| JP | 2005-149848 A | 6/2005 |
| JP | 2007-157540 A | 6/2007 |
| KR | 10-2007-0060026 A | 6/2007 |

* cited by examiner i : ROW
j : POSITION TO LEFT OR RIGHT 1B (3B, 4B)

1C (3C, 4C)

1D (3D, 4D)

LIGHT SOURCE DEVICE, LIGHTING DEVICE, AND DISPLAY DEVICE

RELATED APPLICATIONS

This application is a nationalization under 35 U.S.C. 371 of PCT/JP2009/063888, filed Aug. 5, 2009, and published as WO 2010/016528 A1 on Feb. 11, 2010, which claims priority to Japanese Patent Application Serial No. 2008-203033, filed Aug. 6, 2008, and to Japanese Patent Application Serial No. 2009-157312, filed Jul. 1, 2009, which applications and publication are incorporated herein by reference in their entirety.

TECHNICAL FIELD

The present invention relates to a light source device, a lighting device, and a display device, and more particularly relates to a light source device using a highly directional point light source such as a light-emitting diode as a light source and a lighting device or a display device that can provide uniform illumination light over a large area using such a light source device. These devices can also be used for a backlight for a liquid crystal panel, various display devices, and the like.

BACKGROUND ART

In recent years, study and development of light-emitting diodes (hereinafter, referred to as "LEDs") have rapidly advanced. Accordingly, various types of LEDs are developed, commercialized, and beginning to be used in wide range of fields. The LEDs are now being used in the field of lighting as well. Currently, in the field of lighting, the LEDs are used, for example, as a lighting device for a backlight for a liquid crystal panel, display plates and electrical signboards of various types, and the like.

Generally, the lighting device used for the backlight for a liquid crystal panel is of a direct type in which a diffusion plate is formed of a plate having a certain thickness and area, a light source such as a fluorescent light is disposed below the diffusion plate, and a surface of the diffusion plate emits light by being directly irradiated with light from the light source or an edge-light type in which a light guiding plate is formed of a plate having a certain thickness and area, and a light source such as a fluorescent light and an LED is disposed on at least one side of the light guiding plate to cause a surface of the light guiding plate to emit light.

Of the direct type and the edge-light type, the direct type has a structure in which a certain gap, i.e., a certain distance is provided between the light source and the diffusion plate. If the distance is short, the outer shape of the light source may be projected on the diffusion plate to give unpleasant appearance and degrade the lighting quality. If a highly directional light source is used, uniform illumination light may not be obtained because the brightness of a portion of the diffusion plate right above the light source becomes extremely high to generate difference in brightness between the portion and other lighting areas. As a method of uniformizing the brightness, a large distance may be provided between the diffusion plate and the light source. However, the use of this method causes problems in that desired illumination light cannot be obtained because the entire area proportionally becomes darker as the distance becomes larger, the device cannot be made thin, and the like.

Because the direct type lighting device has such problems, the direct type lighting devices may be difficult to be employed depending on the use.

Because the direct type lighting device has the problems described above, the edge-light type lighting device is used instead of the direct type lighting devices and numerous lighting devices of this type have been proposed (see, for example, Patent Documents 1 to 3).

For example, an edge-light type lighting device is disclosed in Patent Document 1. The lighting device is configured by including a light-emitting diode, a light guiding plate having a size of about a postcard in which a light guiding part is formed to have a flat surface, and a reflecting mirror that reflects light from the light-emitting diode, installing the light-emitting diode on the flat surface of the light guiding plate, and covering the light-emitting diode with the reflecting mirror. Thus, the light emitted from the light-emitting diode is reflected by the reflecting mirror to be guided to the light guiding plate. With the lighting device, the light emitted from the light-emitting diode is efficiently taken into the light guiding plate.

A lighting device including a light source device formed of an LED and a light source rod, and a light guiding plate that guides the light emitted from the light source device is disclosed in Patent Document 2. The light source rod is formed of a prism array of a prescribed shape. The light source rod makes an irradiation target object irradiated with the light emitted from the LED via the light guiding plate to uniformize the brightness.

Patent Document 3 discloses a register guide lamp in which a plurality of light-emitting diodes are disposed on a light entering surface of a light guiding body at an equal interval, light from the light-emitting diodes is irregularly reflected by a reflector, and the irregularly reflected light causes plane emission of light by the light-emitting surface of the light guiding body, whereby a display body disposed facing the light-emitting surface of the light guiding body is illuminated.

PRIOR ART DOCUMENTS

Patent Documents

Patent Document 1: Japanese Patent Application Publication No. 2005-149848 (paragraph [0012], FIG. 1)
Patent Document 2: Japanese Patent Application Publication No. 2001-236811 (paragraphs [0012] to [0014], FIG. 1)
Patent Document 3: Japanese Patent Application Publication No. 2005-99406 (paragraphs [0016] and [0017], FIG. 3)

SUMMARY OF THE INVENTION

Problems to be Solved by the Invention

All of the lighting devices of Patent Documents 1 to 3 are each the edge-light type lighting device using the LED as a highly directional light source and providing one or a plurality of LEDs on one or all sides of a rectangular-shaped light guiding plate so that uniform illumination light can be obtained from a light guiding surface.

However, this type of lighting device has the following problems. Specifically, one of the problems is that the size is difficult to be made larger because a relatively expensive light guiding plate with a certain thickness and size has to be used. For example, the lighting device of Patent Document 1 uses a glass or an acryl plate of a size of a postcard as the light guiding plate, and thus is difficult to be increased in size any further. To somehow increase the size, a larger light guiding plate is required and moreover, a plurality of light-emitting diodes is required as in Patent Document 3, and the light-emitting diodes have to be disposed on light receiving surfaces on all sides of the light guiding plate. Thus, the weight of the lighting device increases, the number of parts increases to make the assembling operation cumbersome, and the cost rises. The lighting device of Patent Document 2 requires a specially shaped light source rod. Even though such a light source rod is used, the size is difficult to be increased.

Another problem is that, increase in size to increase the light-emitting area requires the size of the light guiding plate to be increased proportionally. Such a light guiding plate is made of a thick glass plate or a plastic plate, whereby the weight thereof is heavy, and the lighting device including the light guiding plate increases in weight and also the cost rises. Furthermore, the use of such a large light guiding plate makes a light path from the light source to the light-emitting surface long, whereby light is more attenuated. Thus, uniform illumination light is difficult to be obtained and illumination light of high illuminance is difficult to be obtained as well. To achieve such high illuminance, a high-power light source is required, and thus the cost rises.

Still another problem is related to the above-described problem. Specifically, when the light source is disposed on one side of the light guiding plate as in Patent Documents 1 and 2, the light path from the light source to the light emission surface is long, whereby light is more attenuated. Thus, the size of the light guiding plate is limited after all and the increase in size cannot be achieved.

Accordingly, the conventional edge-light type lighting devices, which are configured by using the light guiding plate and disposing light sources at an area around the light guiding plate, are suitably used as a small-scale lighting device but can be increased in size only to a limited level.

In view of the fact that the use of the light guiding plate in the conventional edge-light type lighting devices is making the plane illumination light of a large area difficult to be obtained, the present inventors have made a trial and error in studying how the plane illumination light of a large area can be obtained without using the light guiding plate even when a highly-directional light source is used. As a result, the present inventors have found that by disposing a highly-directional point light source, e.g., an LED, as a light source at one end side portion of a reflection plate provided with a prescribed reflection/transmission pattern, the light emitted from the LED can be efficiently transmitted from the one end side portion on the reflection plate to the other end side portion in substantially uniformly distributed manner. Thus, the present invention is completed based on this finding.

Thus, an object of the present invention is to provide a light source device, a lighting device, and a display device of edge-light type devices that allow uniform illumination light to be provided over a large area while requiring no light guiding plate required in the conventional techniques even when a highly-directional point light source is used as a light source.

Another object of the present invention is to provide a light source device, a lighting device, and a display device that are light in weight and inexpensive, and can be produced into a desired shape such as a rectangular parallelepiped shape, a circular cone shape, and a pyramid shape.

Means for Solving Problems

The objects mentioned above can be achieved by the following means. Specifically, a light source device including a highly directional point light source, a light source installation part with a prescribed area on which the point light source is installed, and a side reflection part that is vertically arranged to a prescribed height from the periphery of the light source installation part, in which an inner wall surface surrounded by the light source installation part and the side reflection part is formed of a reflection surface. The side reflection part is formed of a light-transmitting reflector plate at least partially provided with a reflection/transmission pattern with a plurality of reflection/transmission parts reflecting and transmitting a part of light from the point light source. With a plurality of virtual radiation lines being drawn at prescribed angles from the point light source on a surface of the light-transmitting reflector plate, the reflection/transmission pattern is set so that relationship of $Re1>Re2$ and $Tr1<Tr2$ is satisfied where $Re1$ denotes a reflection rate of and $Tr1$ denotes a transmission rate of the reflection/transmission parts that have equal distance from the point light source and are on the radiation lines whose directivity angle is small, and $Re2$ denotes a reflection rate of and $Tr2$ denotes a transmission rate of the reflection/transmission parts that are on the radiation lines whose directivity angle is large.

The "directivity angle" in the present invention indicates an angle between the light axis of the point light source and a straight line passing through the point light source and a prescribed position.

The reflection/transmission parts of the reflection/transmission pattern provided at positions farther from the point light source optionally have smaller reflection rates and larger transmission rates on a single radiated line.

The reflection/transmission parts of the reflection/transmission pattern are optionally structured by forming the light-transmitting reflector plate with a reflective material and providing the reflective material with a through hole having an opening of a prescribed size.

The light-transmitting reflector plate is optionally provided with a non-through hole or made thin at an area near the point light source, instead of the through hole.

The reflection/transmission parts of the reflection/transmission pattern are optionally structured by forming the light-transmitting reflector plate with a transparent substrate and providing the transparent substrate with a reflection dot of a prescribed size.

The side reflection part is optionally formed of at least two such light-transmitting reflector plates facing each other.

The side reflection part is optionally shaped in a cylindrical or pyramid form.

The cylindrical form is optionally provided with a reflection plate on a surface facing the light source installation part, the reflection plate is provided with a second point light source, and the light-transmitting reflector material is optionally provided with the reflection/transmission pattern in accordance with the second point light source.

The point light source is optionally a light-emitting diode or a laser diode.

A lighting device includes any one of the above-described light source devices contained in a casing made of a light transmissive material and having a shape similar to that of the light source device.

A display device includes the lighting device whose casing is at least partially provided with a display plate.

Effect of the Invention

According to an aspect of the present invention, the weight and the cost can be reduced because a light guiding plate that is required in a conventional technique is not required, and furthermore, uniform illumination light can be obtained over a large area. More specifically, the weight and the cost can be reduced because no light guiding plate is used, and uniform illumination light can be obtained over a large area because the reflection/transmission pattern is provided to uniformize the light emitted from the point light source. The light source device that can provide illumination light from one side or both sides can be obtained by providing the reflection/transmission pattern partially or entirely on the side reflection part, whereby the device can be used for wider applications.

According to another aspect of the present invention, the reflection/transmission pattern can be easily provided on the light-transmitting reflector plate.

According to still another aspect of the present invention, the light source device of a desired shape can be produced, whereby the device can be used for wider applications.

According to yet still another aspect of the present invention, the light-emitting diode or the laser diode is used as the point light source, whereby the service life is long, power consumption is low, and thus energy saving can be achieved for the lighting device.

According to yet still another aspect of the present invention, the lighting device and the display device having the advantageous effects of the light source device can be provided.

BEST MODE(S) FOR CARRYING OUT THE INVENTION

Embodiments of the present invention are described below with reference to the drawings. It is to be noted that the embodiments described below exemplarily show a light source device, a lighting device, and a display device that embody the technical idea of the present invention. The present invention is not intended to be limited to the embodiments. The present invention can equally be applied to other embodiments included in the scope of claims.

First Embodiment

Figure 1:
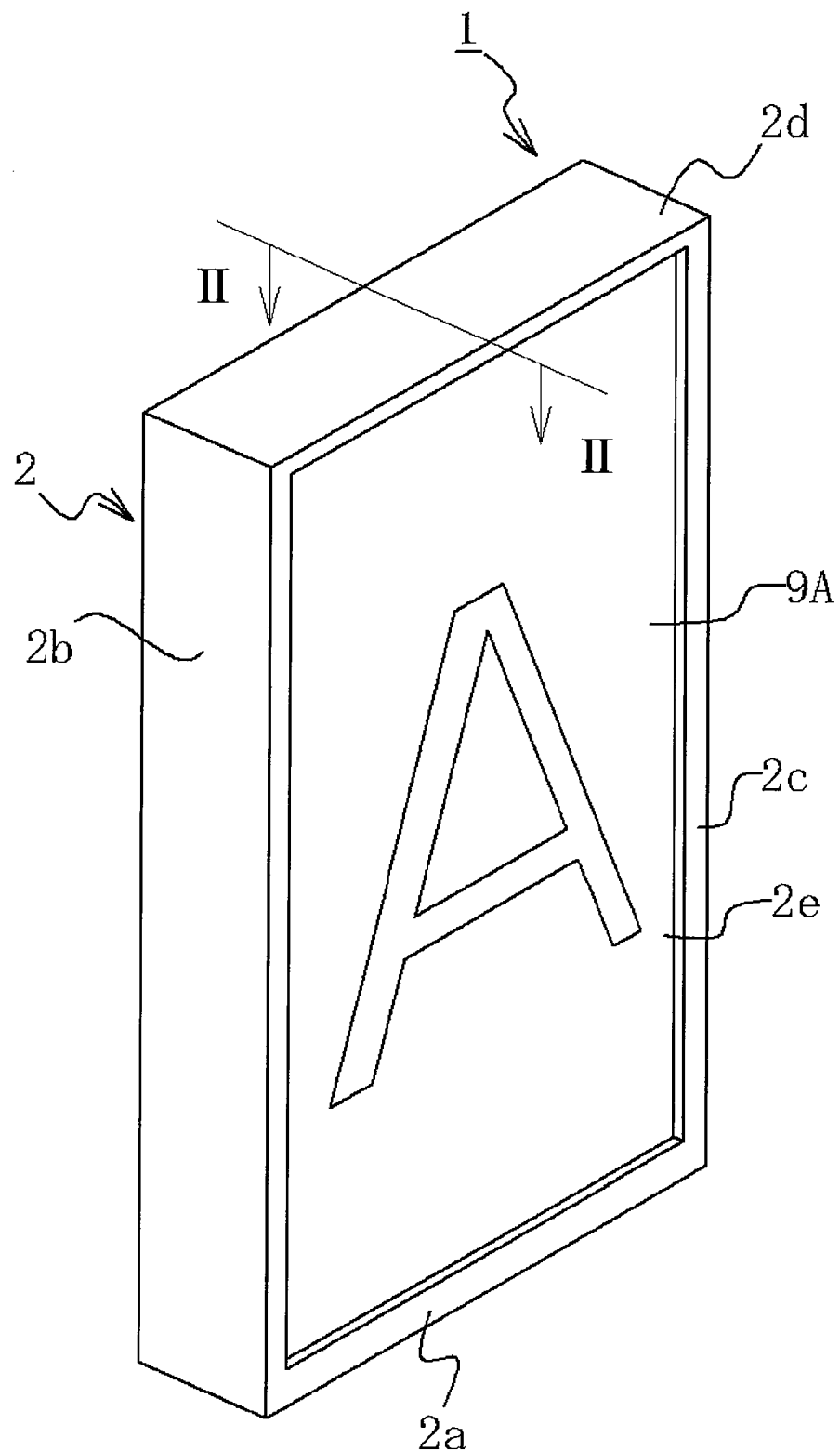
FIG. 1 is a perspective view of a display device according to a first embodiment of the present invention.

To begin with, a display device incorporating a light source device and a lighting device according to a first embodiment of the present invention is described with reference to FIG. 1 and FIG. 2. FIG. 1 is a perspective view of the display device according to the first embodiment of the present invention, and FIG. 2 is a schematic cross-sectional view of the display device in FIG. 1 taken along a line II-II.

Figure 2:
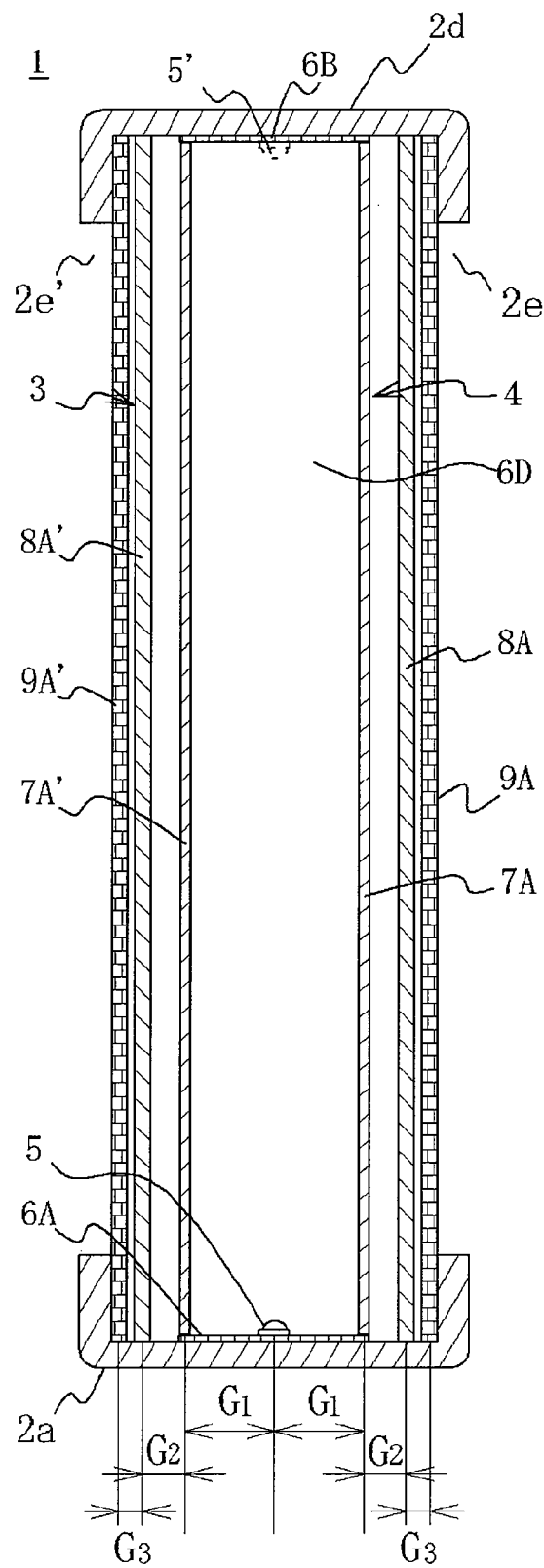
FIG. 2 is a schematic cross-sectional view of the display device in FIG. 1 taken along a line II-II.

As illustrated in FIG. 1 and FIG. 2, the display device 1 includes a frame 2 of a frame-like shape having a pair of opposing short side frames 2a and 2d and a pair of opposing long side frames 2b and 2c and being provided with windows 2e and 2e' of a prescribed size respectively on front and rear sides, a lighting device 3 incorporated in the frame 2, and a pair of display plates 9A and 9A' respectively fitted in the windows 2e and 2e'. The lighting device 3 includes a light source device 4 containing at least one LED 5, and a pair of diffusion plates 8A and 8A' that diffuse light emitted from the light source device. The frame 2 is shared by the display device 1 and the lighting device 3. More specifically, the frame 2 is manufactured and used in accordance with the designs of the display device 1 and the lighting device 3. These frames are formed of a synthetic resin mold or a metal plate material.

Next, the light source device incorporated in the display device is schematically described with reference to FIG. 2 and FIG. 3. Note that FIG. 3 is an exploded perspective view of the light source device incorporated in the lighting device shown in FIG. 1.

Figure 3:
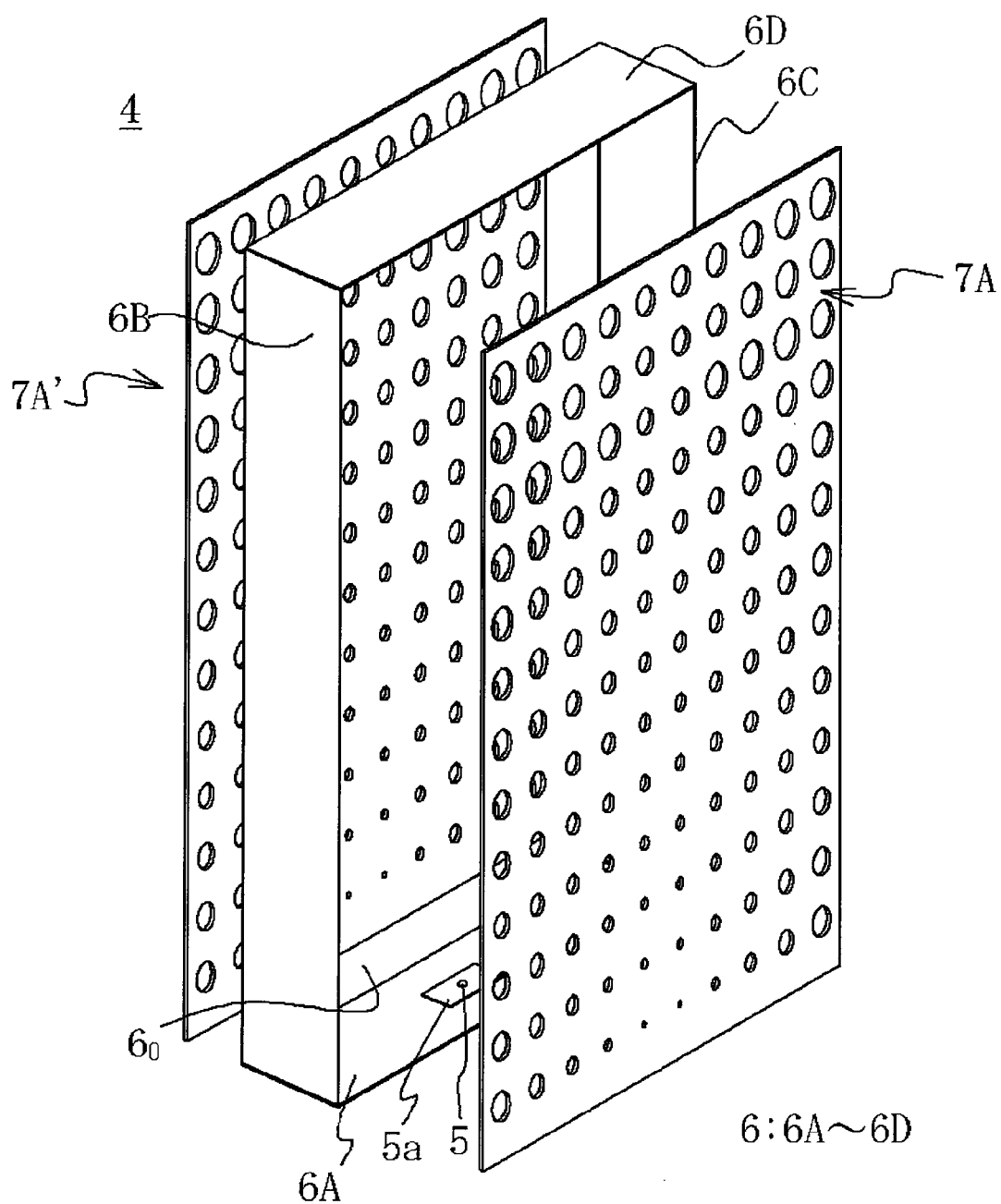
FIG. 3 is an exploded perspective view of a light source device incorporated in a lighting device in FIG. 1.

As illustrated in FIG. 2 and FIG. 3, the light source device 4 includes the single LED 5 fixed to a plate-shaped substrate 5a having a prescribed size, a reflection frame 6 formed of a rectangular frame to which the LED is mounted on one side thereof and provided with openings of a prescribed size at front and rear sides to have an internal space of a prescribed volume, and a pair of opposing light-transmitting reflector plates 7A and 7A' provided to cover the openings at the front and rear sides, respectively.

As illustrated in FIG. 3, the reflection frame 6 is formed of a rectangular frame including a rectangular bottom plate 6A having a prescribed width and length, a pair of opposing side plates 6B and 6C vertically arranged to a prescribed height from respective short sides of the bottom plate, and a ceiling plate 6D connecting the top portions of the side plates, having an internal space of a prescribed volume, and being provided with an opening $6_o$ on front and rear sides. The reflection frame 6 is defined by the bottom plate 6A, the side plates 6B and 6C, and the ceiling plate 6D, and its inner surface is formed of a reflection surface made of a material that has low light absorption rate and irregularly reflects light with high reflection rate. The reflection frame 6 is preferably formed using an ultrafinely foamed reflection material, for example. Alternatively, the reflection frame 6 may be formed by coating a substrate and the like with emulsified particles of titanium white or emulsified particles of polytetrafluoroethylene.

The LED 5 is installed on the plate-like substrate 5a to be fixed on the bottom plate 6A of the reflection frame 6. More specifically, as illustrated in FIG. 2, the LED 5 is fixed at a middle position at a portion substantially center of the bottom plate 6A and separated from the pair of opposing light-transmitting reflector plates 7A and 7A' by prescribed gaps of equal distance $G_1$ and $G_1$. The distance $G_1$ is 20 mm, for example. The assembled light source device is light in weight because a light guiding plate and the like is not provided in the gaps. The substrate 5a is formed of a metal plate of a prescribed size and has a heat discharge function.

The LED 5 is formed by a single light-emitting element or by assembling a plurality of light-emitting elements. The LED is low in working voltage and long in service life compared with a fluorescent lamp, an incandescent lamp, and the like. As a result, the LED can save more energy than the fluorescent lamp, the incandescent lamp, and the like do.

Moreover, an LED that emits light of three primary colors, i.e., R, G, and B can be used as the LED 5. By using such an LED, illumination light of various colors can be obtained. If the light source device provided with such an LED is incorporated in the display device, an emergency lamp can be easily produced that emits blue light in a safe condition and changes the light to red light in a dangerous condition. Although the LED is used in this embodiment, other light sources, for example, a laser diode and the like can also be used. A lens and the like may be attached to a light-emitting part of the LED and the laser diode. Moreover, although a single LED is provided on the reflection frame in this embodiment, a plurality of LEDs may be used. When a plurality of LEDs is disposed, the LEDs are disposed in an accumulated manner or with certain distances provided therebetween. When the LEDs are disposed with certain distances therebetween, the reflection/transmission pattern of the light-transmitting reflector plates to be described later is formed to correspond to each of the LEDs.

Figure 4:
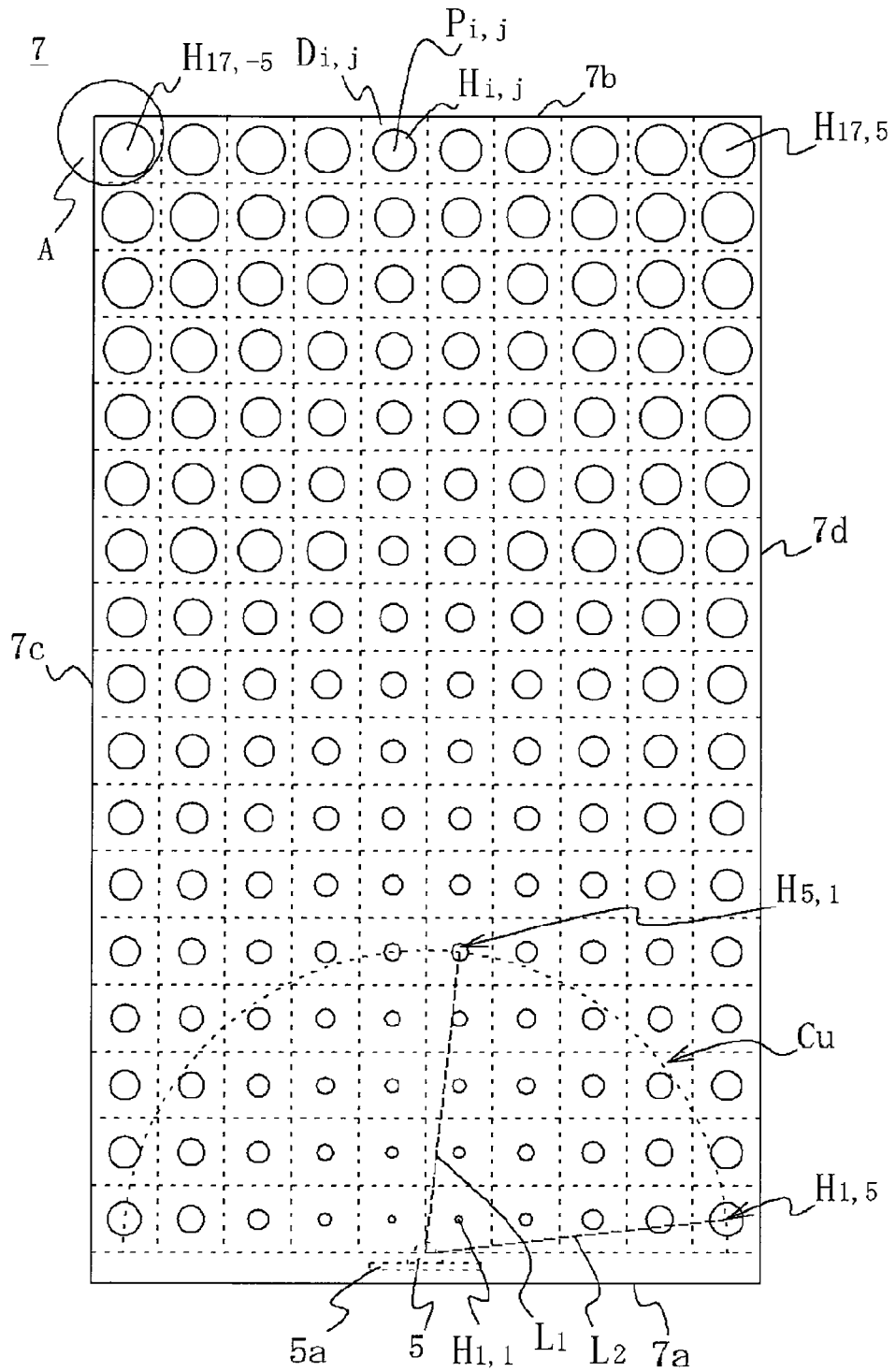
FIG. 4 is a front view of a light-transmitting reflector plate constituting the light source device in FIG. 3.
Figure 5:
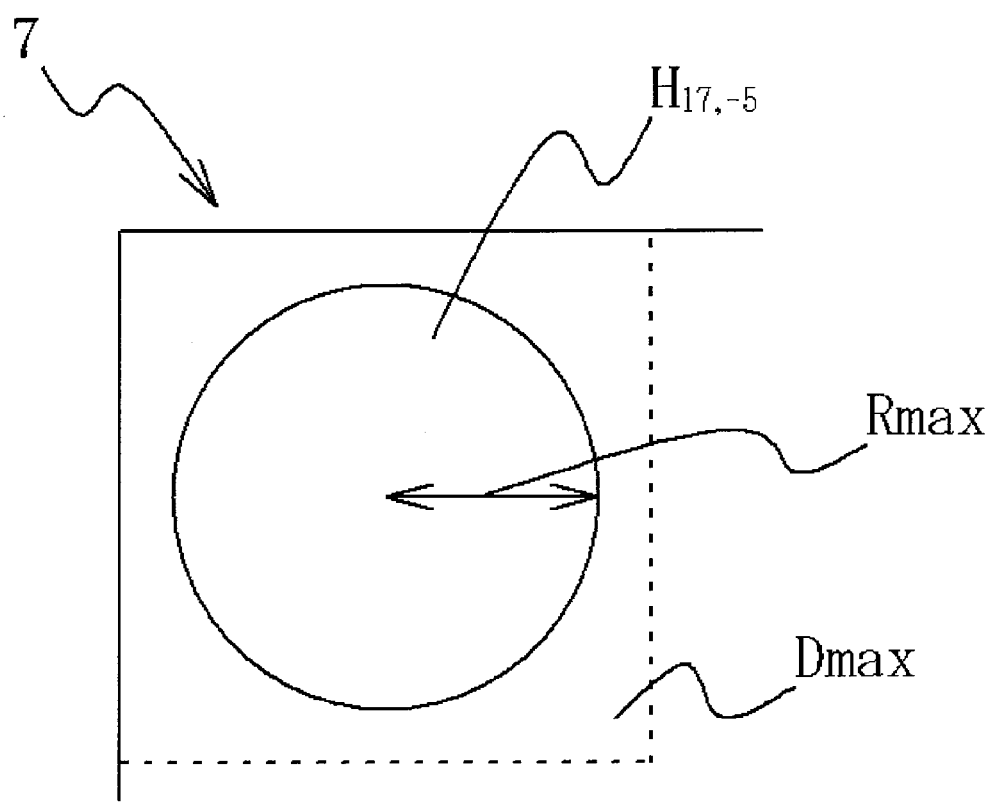
FIG. 5 is an enlarged view of an A section in FIG. 4.
Figure 6A:
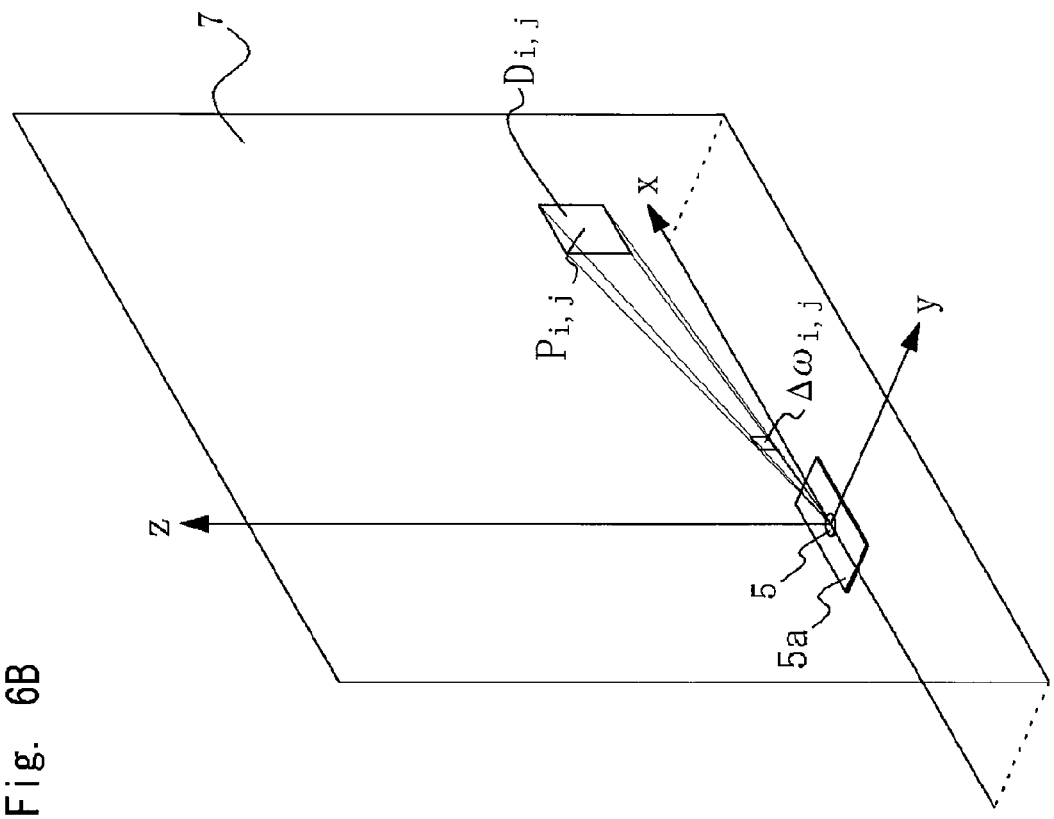
FIGS. 6A and 6B are explanation views for explaining a method for obtaining illuminance at a potion away from a point light source.
Figure 6B:
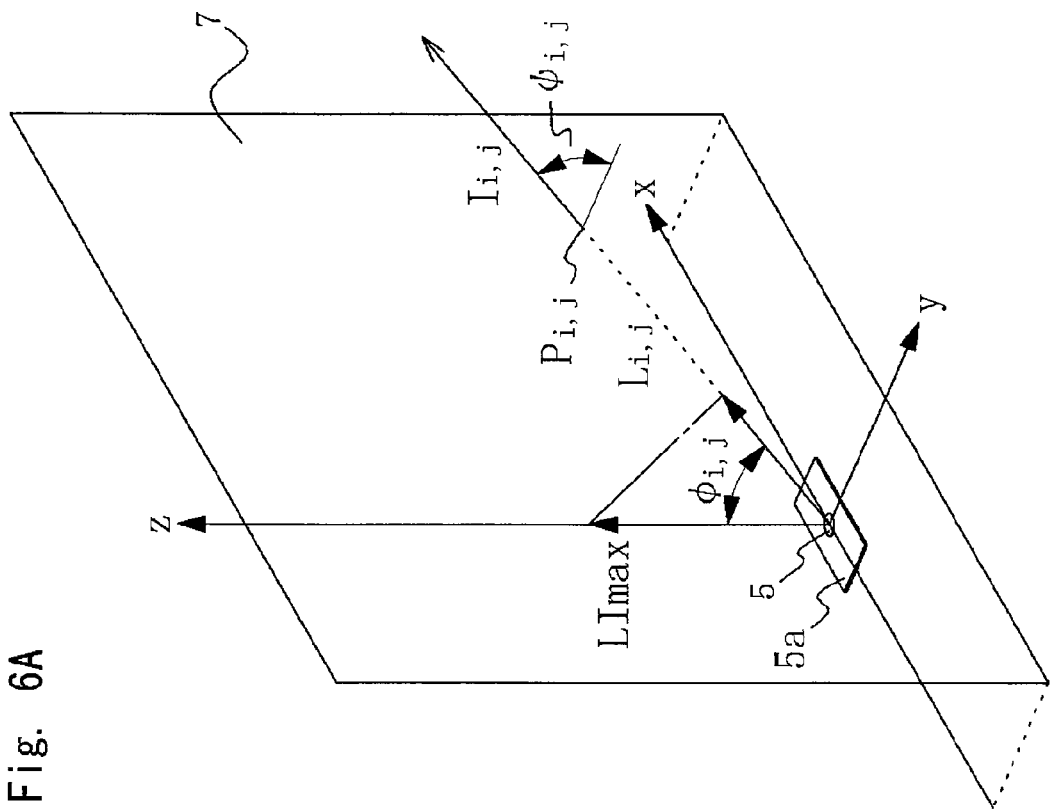
Figure 7:
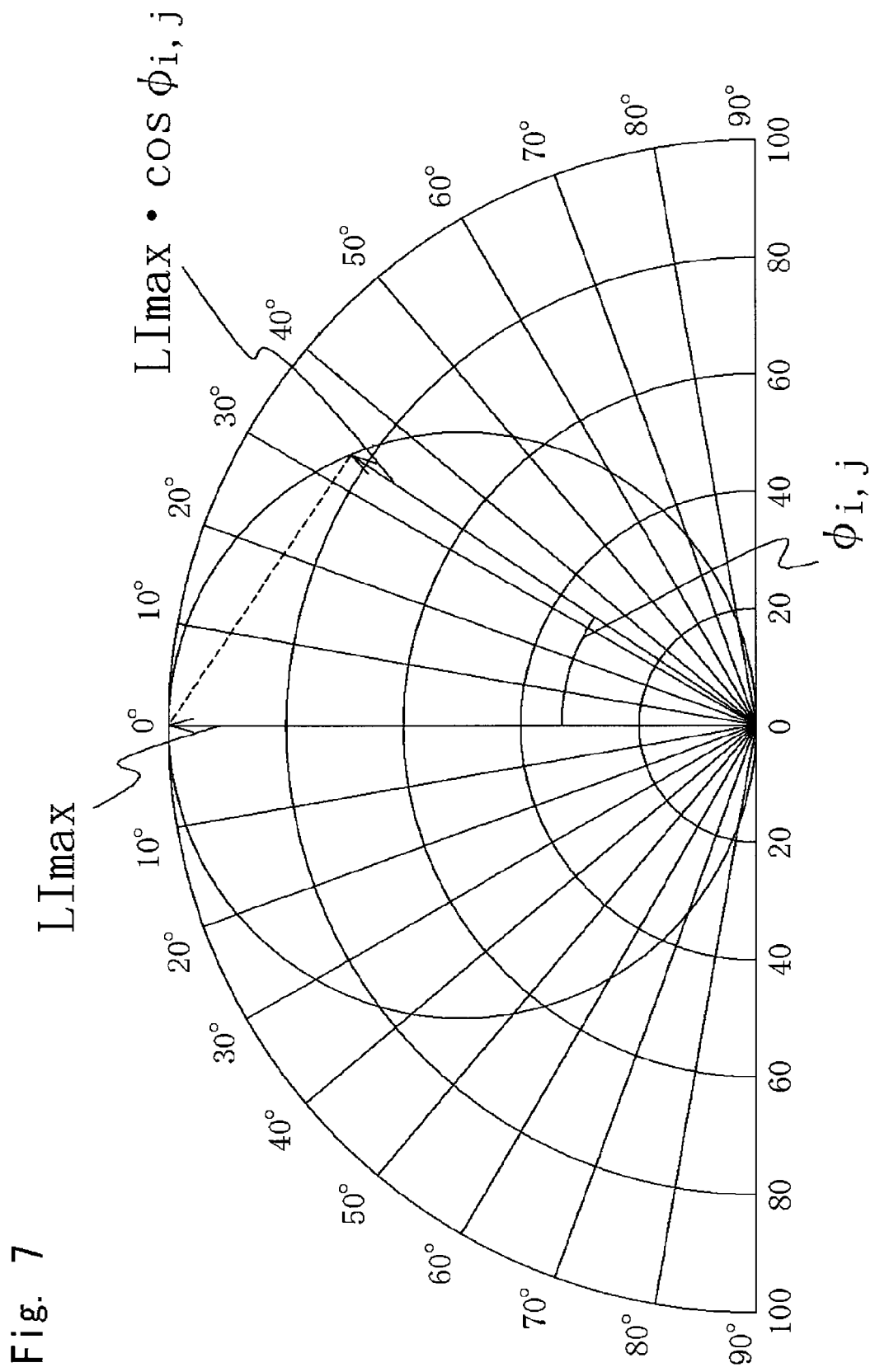
FIG. 7 is a light distribution characteristic chart of an LED.

The light-transmitting reflector plates constituting the light source device are described with reference to FIG. 4 to FIG. 6. FIG. 4 is a front view of one of the light-transmitting reflector plates constituting the light source device in FIG. 3. FIG. 5 is an enlarged view of an A section in FIG. 4. FIGS. 6A and 6B are explanation views for explaining a method for obtaining the illuminance at a portion away from the point light source (LED). FIG. 7 is a light distribution characteristic chart of the LED.

The pair of light-transmitting reflector plates 7A and 7A' have the same structure. One of the light-transmitting reflector plates is given the numeral 7 and described.

A curved line Cu in FIG. 4 represents an equidistance curve connecting positions or areas that are of equal distance from the LED 5. Straight lines connecting the LED 5 and the equidistance curve Cu are equidistance lines. These equidistance lines are part of radial lines extending on the light-transmitting reflector plate from the LED 5. The LED 5 has certain light distribution characteristics (see FIG. 7). When the light distribution characteristics are superimposed on the equidistance lines, a unit area $H_{5,1}$ in FIG. 4 is positioned on an equidistance line $L_1$ of which the directional angle from the LED 5 is substantially 0° and a unit area $H_{1,5}$ is positioned on an equidistance line $L_2$ of which the directional angle from the LED 5 is substantially 90°.

These unit areas are each provided with a reflection/transmission part that reflects and transmits a part of the light from the LED. The reflection/transmission part is set to have prescribed reflection rate and transmission rate. Specifically, if one unit area $H_{5,1}$ has a reflection rate of Re1 and transmission rate of Tr1, and the other unit area $H_{1,5}$ has a reflection rate of Re2 and transmission rate of Tr2, the relationship therebetween is set to be Re1>Re2 and Tr1<Tr2. In other words, the reflection rate and the transmission rate on the equidistance line $L_2$ of which the directional angle is substantially 90° and the reflection rate and the transmission rate on the equidistance line $L_1$ of which the directional angle is substantially 0° are so set that the former have a lower reflection rate and a higher transmission rate while the latter have a higher reflection rate and a lower transmission rate. Due to this setting, the transmission amount of light through the light-transmitting reflector plate is reduced on the latter and increased on the former. Thus, areas on the $L_2$ are prevented from being darker than areas on the $L_1$.

The relationship Re1>Re2 and Tr1<Tr2 is also set on the equidistance lines between $L_1$ and $L_2$ besides other equidistance lines $L_1$ and $L_2$ connecting the LED 5 and the equidistance curve. On each of the radial lines including these equidistance lines, a reflection/transmission part at a portion farther from the LED 5 is set to have a lower reflection rate and a higher transmission rate.

The relationship Re1>Re2 and Tr1<Tr2 is achieved by providing the light-transmitting reflector plate 7 with the prescribed reflection/transmission pattern. The reflection/transmission pattern is formed by, for example, a method in which a reflection plate with a high reflection rate is used for the light-transmitting reflector plate and the reflection plate is provided with through holes having openings of prescribed sizes, or a method in which a transparent substrate is used for the light-transmitting reflector plate and the transparent substrate is provided with reflection dots having prescribed areas.

The reflection/transmission pattern formed by the method of providing the light-transmitting reflector plate 7 with through holes having openings of prescribed sizes is described below.

As illustrated in FIG. 4, the light-transmitting reflector plate 7 is formed of a rectangular plate including opposing short sides 7a and 7b and opposing long sides 7c and 7d and having a prescribed thickness and a size suitable for enclosing the opening $6_o$ of the reflection frame 6. The light-transmitting reflector plate 7 is made of a material having a high reflection rate, low light transmission rate, and low light absorption rate such as an ultrafinely foamed reflection plate. Note that an ultrafinely foamed reflection plate having a reflection rate of about 98%, a light transmission rate of about 1%, and a light absorption rate of about 1% is known, and this material is preferably used. Other materials such as a transparent substrate and the like on which emulsified particles of titanium white or emulsified particles of polytetrafluoroethylene is coated or screen printed may also be used.

The light-transmitting reflector plate 7 is divided into a plurality of unit areas having the same shape (square, for example). The unit areas are each provided with a light transmission hole having an opening of a prescribed size that transmits a prescribed amount of light. Areas surrounded by dotted lines in a lattice pattern in FIG. 4 are the unit areas. Regarding a unit area Di, j in FIG. 4, the sign D represents a unit area in a prescribed position, the sign i represents a row in horizontal lines provided from one short side 7a to the other short side 7b at an equal interval, and the sign j represents a position of the area to the right or left on the horizontal line with respect to the LED 5. The sign Hi, j represents an opening in the unit area Di, j. For example, an opening $H_{17,5}$ represents a fifth opening to the right on the 17th row with respect to the LED 5.

The size of the opening Hi, j in the prescribed unit area Di, j can be determined by the following method. First, illuminance I is obtained from a calculation (described later). Then, a circular opening having the maximum radius Rmax is provided in a prescribed area Dmax at which the illuminance I is the lowest (see FIG. 5). The radius Rmax is equal to 40% of a side of the prescribed area, i.e., the diameter is 80% of the side. The larger radius makes the joining portion (hereinafter, referred to as a crosspiece) between neighboring openings thin to weaken the mechanical strength, and thus affects the durability of the light-transmitting reflector plate 7. The diameter may be about 90% of the side by using the light-transmitting reflector plate 7 having relatively high mechanical strength. Moreover, the opening may be of a desired shape besides a circle such as a triangle, a rectangle, or a star shape.

Next, a size of the opening in the prescribed area Di, j other than Dmax is obtained based on the radius Rmax provided in the Dmax. First, a length Li, j from the LED 5 to a prescribed position Pi, j (a barycentric position or a position closest to the LED 5 in the prescribed area Di, j) in the prescribed area Di, j, a directivity angle $\Phi_{i,j}$, and an angle $\Psi_{i,j}$ between the straight line in the normal direction at the prescribed position $P_{i,j}$ and a straight line passing through the LED 5 and the prescribed position $P_{i,j}$ are measured. Illuminance $I_{i,j}$ on the prescribed area $D_{i,j}$ may be measured by using an illuminometer or an estimate thereof may be obtained through calculation.

The illuminance $I_{i,j}$ at the prescribed position $P_{i,j}$ is obtained through calculation using the length $L_{i,j}$, the directivity angle $\Phi_{i,j}$, and the angle $\Psi_{i,j}$ between the straight line in the normal direction at the prescribed position $P_{i,j}$ and the straight line passing through the LED 5 and the prescribed position $P_{i,j}$.

As illustrated in FIG. 6, with the LED 5 being the origin, the x axis is in a direction parallel with the light-transmitting reflector plate 7, the y axis is in a direction orthogonally crossing the x axis on a plane parallel with the substrate 5a, the z axis is in a direction perpendicular to the substrate 5a, and orthogonal coordinates at the prescribed position $P_{i,j}$ are $(x_{i,j}, y_{i,j}, z_{i,j})$. As illustrated in FIG. 6, the maximum light intensity LImax of the light emitted from the LED 5 is obtained in the positive direction on the z axis. Light intensity in the direction to the prescribed position $P_{i,j}$ is proportional to $LImax \cdot \cos \Phi_{i,j}$. Light flux $F_{i,j}$ of the entire light received at the prescribed area $D_{i,j}$ is $$F_{i,j} = K \cdot LImax \cdot \cos \Phi_{i,j} \cdot \Delta \omega_{i,j} = K' \cdot \cos \Phi_{i,j} \cdot \Delta A_{i,j} \cdot \cos \Psi_{i,j} / L_{i,j}^2$$

where $\Delta \omega_{i,j}$ is a solid angle of the prescribed area $D_{i,j}$ viewed from the LED 5, $\Delta A_{i,j}$ is the area of the prescribed area $D_{i,j}$, and K is a proportional constant. Here, $K \cdot LImax$ is represented by $K'$.

Illuminance is an amount of light fluxes incident per unit area. Thus, the illuminance $I_{i,j}$ at the prescribed position $P_{i,j}$ is $$I_{i,j} = F_{i,j} / \Delta A_{i,j} = K' \cdot \cos \Phi_{i,j} \cdot \cos \Psi_{i,j} / L_{i,j}^2$$

where $\cos \Phi_{i,j} = z_{i,j} / (x_{i,j}^2 + y_{i,j}^2 + z_{i,j}^2)^{1/2}$, $\cos \Psi_{i,j} = y_{i,j} / (x_{i,j}^2 + y_{i,j}^2 + z_{i,j}^2)^{1/2}$, and $L_{i,j} = (x_{i,j}^2 + y_{i,j}^2 + z_{i,j}^2)^{1/2}$.

Thus, $I_{i,j} = K' \cdot y_{i,j} \cdot z_{i,j} / (x_{i,j}^2 + y_{i,j}^2 + z_{i,j}^2)^2$.

The length in the y axis direction is constant. Thus, $I_{i,j}$ at the prescribed position $P_{i,j}$ can be easily calculated by obtaining the lengths in the x axis direction and the z axis direction on the surface of the light-transmitting reflector plate 7.

The radius $R_{i,j}$ of the opening at the prescribed position $P_{i,j}$ is calculated using the square root of the rate of an illuminance Imin in the prescribed area Dmax to the calculated illuminance $I_{i,j}$. Specifically, $R_{i,j} = Rmax \cdot \sqrt{(Imin / I_{i,j})}$. Accordingly, the higher illuminance $I_{i,j}$ is directly related to the smaller area of the opening at the prescribed position $P_{i,j}$.

The LED 5 generally has the light distribution characteristics as illustrated in FIG. 7. The lower light intensity of this LED is directly related to the larger tilting with respect to the light axis. By determining the opening with the above method, the opening $H_{1,5}$ in the direction parallel to the substrate 5a has larger opening area than the opening $H_{5,1}$ in the direction perpendicular to the substrate 5a as illustrated in FIG. 4, the opening $H_{1,5}$ and the opening $H_{5,1}$ having the same distance to the LED 5. Thus, illuminance at an area near the LED 5 can be especially uniformized.

The above method obtains the area of the opening using the direct light from the LED alone. More uniformized illuminance can be obtained by determining the area of the opening while taking into consideration the light reflected by the light-transmitting reflector plate 7 and the reflection frame 6. In such a case, a reflecting position of the reflected light is assumed as a virtual light source and perfect diffusion is assumed to be made on the virtual light source. The opening rate is obtained based on the total illuminance obtained by the addition of the calculated reflection illuminance determined by the length from the virtual light source and the angle between the virtual light source and the prescribed position $P_{i,j}$.

The reflection/transmission pattern is a pattern of through holes provided on the respective unit areas of the light-transmitting reflector plate and having openings of prescribed sizes. The method of forming such through holes, however, makes an area of an opening at an area near the LED 5 too small, thereby causing technical difficulty in forming a through hole with a small opening area. Thus, the area near the LED 5 is made thin or provided with a non-through hole or a groove of a prescribed shape instead of being provided with a through hole.

In this embodiment, the reflection/transmission pattern is described that is formed by providing the light-transmitting reflector plate with through holes having openings. Instead, the reflection/transmission pattern may be formed by using a transparent substrate as the light-transmitting reflector plate and providing the transparent substrate with reflection dots having prescribed areas.

In this reflection/transmission pattern, the transparent substrate is used for the light-transmitting reflector plate. Thus, the relationship between the reflection rate and the transmission rate of the unit areas is opposite from that in the above reflection/transmission pattern.

Referring back to FIG. 1 and FIG. 2, the display device and the lighting device are described.

The display device 1 is formed by incorporating the light source device 4, two light diffusion plates 8A and 8A' that diffuse the light emitted from the light source device, and two display plates 9A and 9A' in the frame 2 of a frame-like shape having the windows 2e and 2e' respectively on both side surfaces. As illustrated in FIG. 2, the two light diffusion plates 8A and 8A' are disposed while being apart from the respective light-transmitting reflector plates 7A and 7A' of the light source device 4 by a prescribed distance (gap) $G_2$. The display plates 9A and 9A' are provided facing each other while being apart from the respective light diffusion plates 8A and 8A' by a prescribed distance (gap) $G_3$. The distance (gap) $G_2$ is, for example, 15 mm.

In the display device, the light diffusion plate is provided between each set of the display plate and light-transmitting reflector plate. Thus, the distance between the display plate and the light-transmitting reflector plate can be made short. Moreover, unpleasant appearance due to the scattering of light by the light diffusion plate hiding the reflection/transmission pattern of the light-transmitting reflector plate is prevented. The display plate is provided with a desired letter, picture, or the like. By using such a display plate having the letter or the like, the display device can be used as a display lamp of various types.

In the display device 1, the light diffusion plate is provided between the light source device and the display plate. However, the light diffusion plate may not be provided. When the light diffusion plate is not provided, the gap between the light source device and the display plate is preferably set to the distance about two to three times as long as the maximum radius Rmax. This is because when the gap is narrow, that is, when the light-transmitting reflector plates 7A and 7A' are too close to the respective display plates 9A and 9A', the reflection/transmission patterns on the light-transmitting reflector plates may be projected on the respective display plates to give unpleasant appearance and degrade the lighting quality.

The lighting device 3 is formed by not providing the display plates 9A and 9A' to the display device 1. This lighting device can be used as a room lamp and the like.

Figure 8:
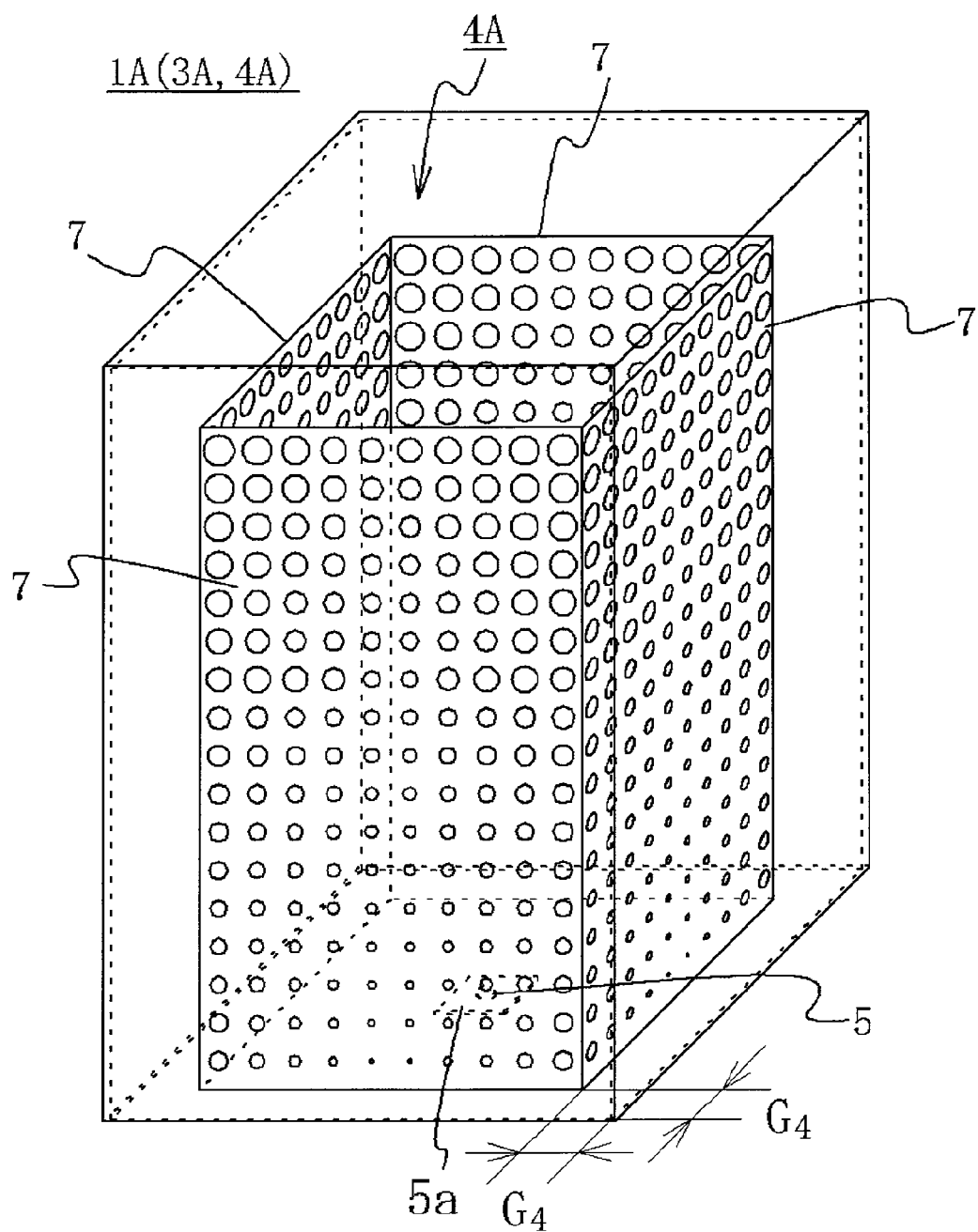
FIG. 8 is a perspective view of a display device of a modification of FIG. 1.
Figure 9A:
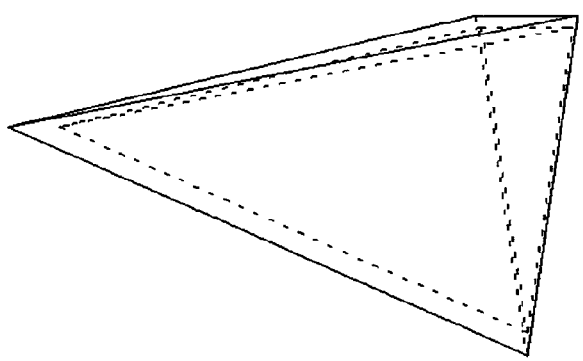
FIG. 9 is a perspective view of a display device of another modification of FIG. 1.
Figure 9B:
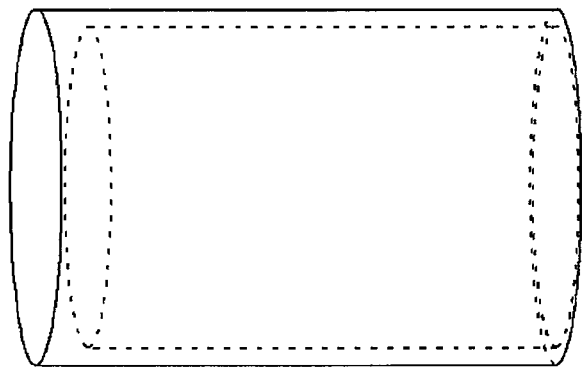
Figure 9C:
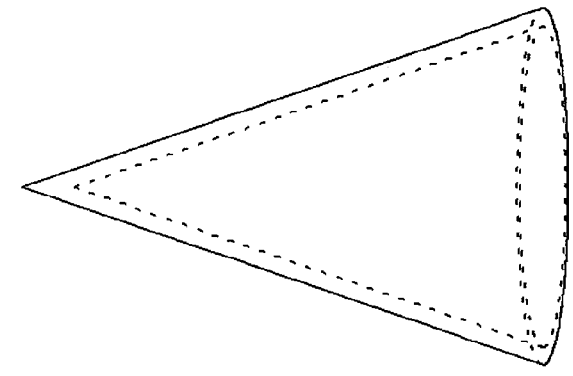
Figure 10:
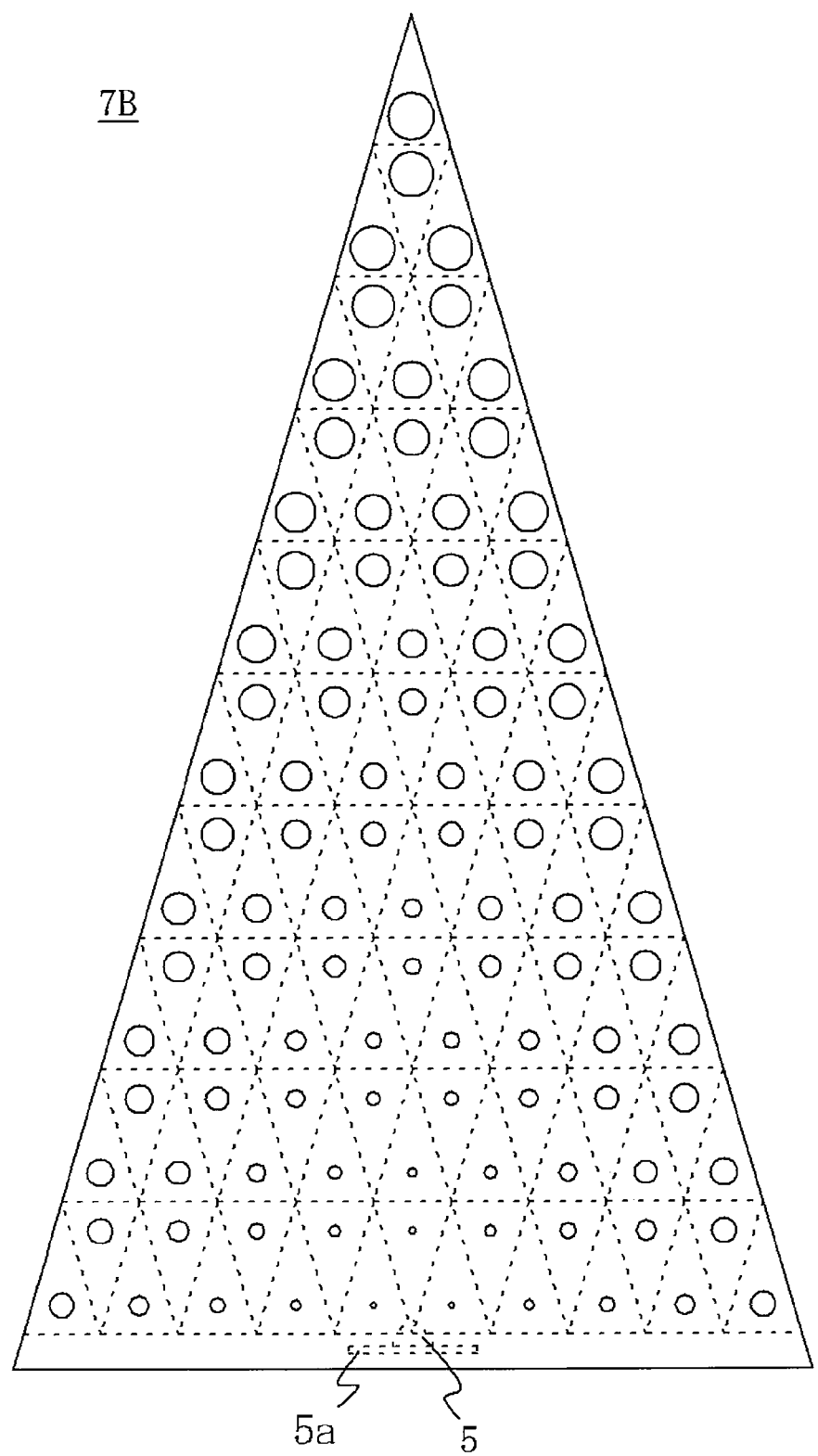
FIG. 10 is a front view of a light-transmitting reflector plate incorporated in display devices illustrated in FIGS. 9A and 9C.

The light source device, the lighting device, and the display device according to the first embodiment of the present invention have been described above. While these devices are double-faced lighting devices that emit illumination light from both the front and the rear surfaces, they may alternatively be single-faced lighting devices or lighting devices that emit illumination light in the directions of all the side surfaces. To form the single-faced lighting device, any one of the pair of light-transmitting reflector plates 7A and 7A' of the light source device 4 is formed of a reflection plate that is not provided with the reflection/transmission pattern, and the light diffusion plate and the display plate of the lighting device and the display device are not provided on the side on which such reflection plate is provided. Alternatively, to form the lighting device that emits illumination light in the directions of all the side surfaces, each of all the four side surfaces is provided with the light-transmitting reflector plate as illustrated in FIG. 8. The lighting device in FIG. 8 has a rectangular parallelepiped shape. Instead, the lighting device may have a cylindrical shape as illustrated in FIG. 9B. Moreover, the light-transmitting reflector plate may be provided not only to the side surface but also to the ceiling plate. Furthermore, the lighting device may have a circular cone shape or a pyramid shape as respectively illustrated in FIG. 9A and FIG. 9C. For example, the light-transmitting reflector plate having a reflection/transmission pattern as illustrated in FIG. 10 is used for these shapes.

Figure 11:
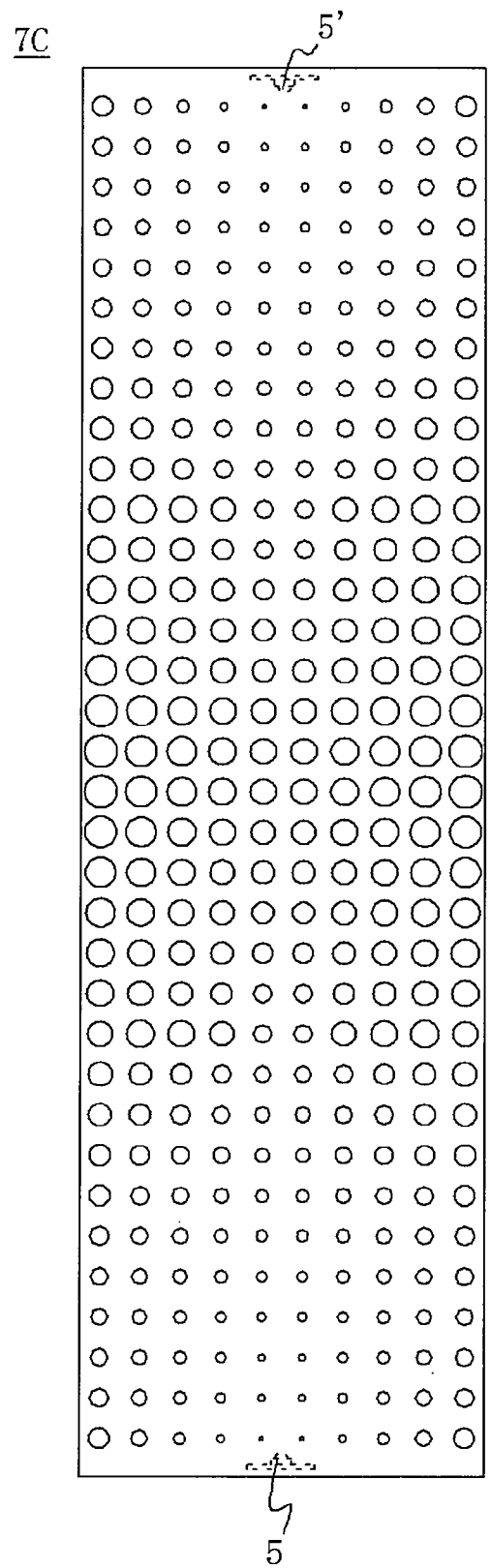
FIG. 11 is a front view of a light-transmitting reflector plate used in a light source device, a lighting device, and a display device according to a second embodiment of the present invention.
Figure 12:
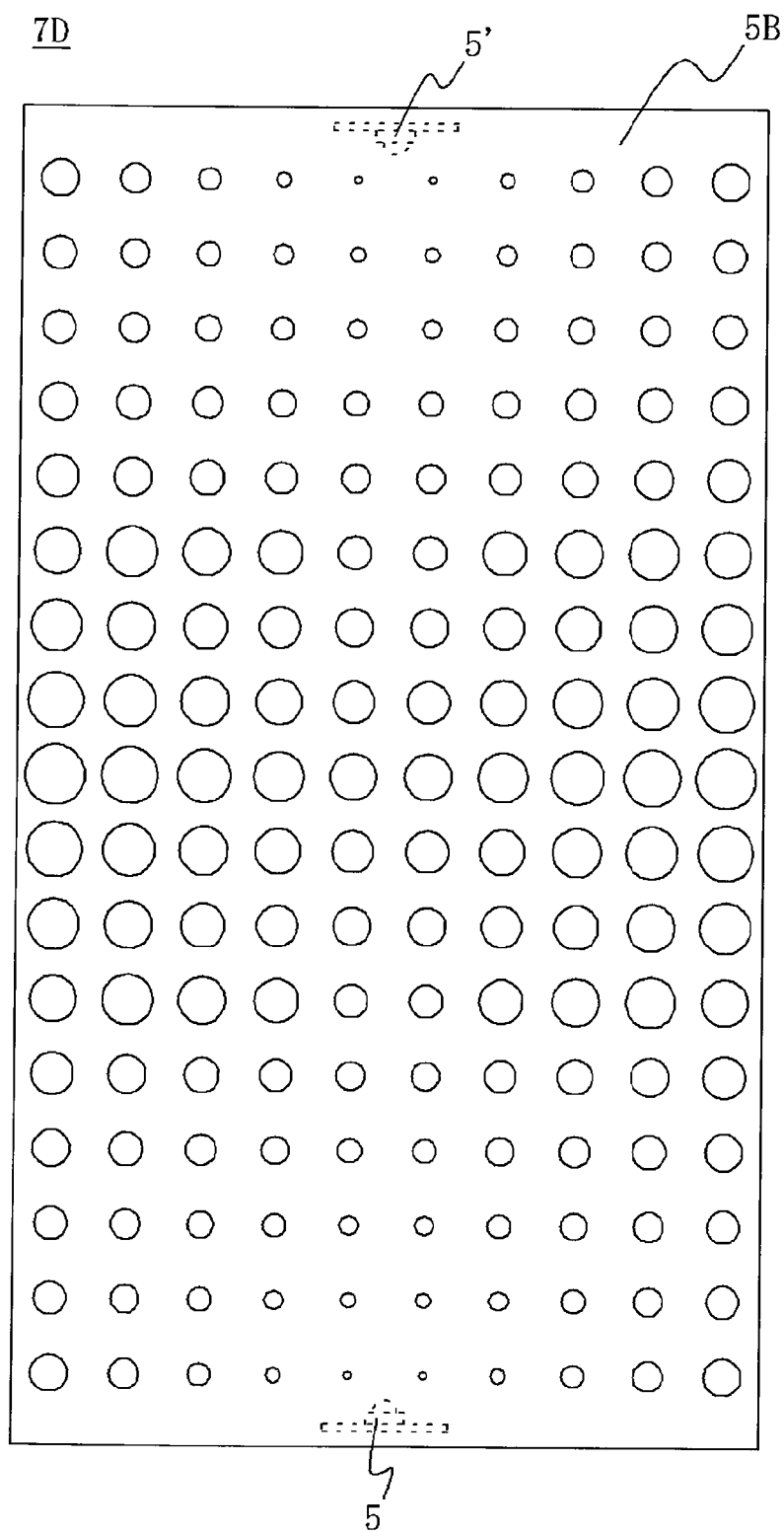
FIG. 12 is a front view of a modification of the light-transmitting reflector plate in FIG. 11.

Next, a light source device, a lighting device, and a display device according to a second embodiment of the present invention are described with reference to FIG. 11 and FIG. 12. FIG. 11 is a front view of a light-transmitting reflector plate used in the light source device, the lighting device, and the display device according to the second embodiment of the present invention. FIG. 12 is a front view of a modification of the light-transmitting reflector plate in FIG. 11.

The light source device, the lighting device, and the display device according to the second embodiment of the present invention are formed by increasing the number of point light source, i.e., the LED in the devices according to the first embodiment and partly changing the reflection/transmission pattern of the light-transmitting reflector plate due to the increase in the number of the LEDs. Thus, elements common in these devices and the respective devices of the first embodiment are given the same reference numerals and duplicated explanations are omitted. Thus, different structures are described.

These light source device, lighting device, and display device are provided with an additional LED 5' on the ceiling plate 6D of the reflection frame 6. Furthermore, a light-transmitting reflector plate 7C (see FIG. 11) is provided in place of the light-transmitting reflector plates 7A and 7A' of the devices of the first embodiment. The light-transmitting reflector plate 7C is formed by providing the reflection plate with the reflection/transmission pattern provided on the light-transmitting reflector plate 7 (see FIG. 4) to correspond to the additionally provided LED 5'.

With these devices, due to the additionally provided LED, the light source device, the lighting device, and the display device having an increased height can be obtained.

In the light-transmitting reflector plate 7C, the reflection/transmission pattern formed on the light-transmitting reflector plate 7 is provided on each of the opposing short sides of the light-transmitting reflector plate 7B to correspond to each of the LEDs. This configuration provides an elongated shape as illustrated in FIG. 11. A light-transmitting reflector plate 7D may also be formed by deleting every other rows of reflection/transmission parts (see FIG. 12). With this reflection/transmission pattern, the devices having the elongated shape can be somewhat widened, and uniform illumination light with higher illuminance can be obtained due to the additionally provided LED.

EXPLANATION OF REFERENCE NUMERALS 1, 1A to 1D display device
2 frame
3, 3A to 3D lighting device
4 light source device
5 LED
6 reflection frame
7, 7A, 7A', 7B to 7D light-transmitting reflector plate
8A, 8A' light diffusion plate
9A, 9A' display plate

The invention claimed is:

1. A light source device comprising:
a highly directional point light source;
a light source installation part with a prescribed area on which the point light source is installed; and
a side reflection part that is vertically arranged to a prescribed height from the periphery of the light source installation part, an inner wall surface surrounded by the light source installation part and the side reflection part being formed of a reflection surface; wherein
the side reflection part is formed of a light-transmitting reflector plate at least partially provided with a reflection/transmission pattern with a plurality of reflection/transmission parts reflecting and transmitting a part of light from the point light source,
with a plurality of virtual radiation lines being drawn at prescribed angles from the point light source on a surface of the light-transmitting reflector plate, the reflection/transmission pattern is set so that relationship of Re1>Re2 and Tr1<Tr2 is satisfied where Re1 denotes a reflection rate of and Tr1 denotes a transmission rate of the reflection/transmission parts that have equal distance from the point light source and are on the radiation lines whose directivity angle is small, and Re2 denotes a reflection rate of and Tr2 denotes a transmission rate of the reflection/transmission parts that are on the radiation lines whose directivity angle is large,
wherein the reflection/transmission parts of the reflection/transmission pattern are structured by forming the light-transmitting reflector plate with a reflective material and providing the reflective material with a through hole having an opening of a prescribed size, and
wherein the light-transmitting reflector plate is provided with a non-through hole or made thin at an area near the point light source, instead of the through hole.

2. The light source device according to claim 1, wherein the reflection/transmission parts of the reflection/transmission pattern provided at positions farther from the point light source have smaller reflection rates and larger transmission rates on a single radiated line.

3. The light source device according to claim 1, wherein the reflection/transmission parts of the reflection/transmission pattern are structured by forming the light-transmitting reflector plate with a transparent substrate and providing the transparent substrate with a reflection dot of a prescribed size.

4. The light source device according to claim 1, wherein the side reflection part is formed of at least two such light-transmitting reflector plates facing each other.

5. The light source device according to claim 1, wherein the side reflection part is shaped in a cylindrical or pyramid form.

6. The light source device according to claim 5, wherein the cylindrical form is provided with a reflection plate on a surface facing the light source installation part, the reflection plate is provided with a second point light source, and the light-transmitting reflector material is provided with the reflection/transmission pattern in accordance with the second point light source.

7. The light source device according to claim 1, wherein the point light source is a light-emitting diode or a laser diode.

8. A lighting device comprising:
   the light source device according to claim 1, contained in a casing made of a light transmissive material and having a shape similar to that of the light source device.

9. A display device comprising:
   the lighting device according to claim 8 whose casing is at least partially provided with a display plate.

* * * * *